United States Patent [19]

Vincent

[11] 4,178,484

[45] Dec. 11, 1979

[54] LONG LINE TELEPHONE SYSTEM WITH AN AMPLIFYING SUBSTATION

[76] Inventor: Ogden W. Vincent, 2166 La Miel Way, Campbell, Calif. 95008

[21] Appl. No.: 810,417

[22] Filed: Jun. 27, 1977

[51] Int. Cl.[2] ........................ H04M 1/00; H04M 3/00

[52] U.S. Cl. ................................ 179/16 C; 179/16 D; 179/23

[58] Field of Search ........................ 179/16 C, 16 D, 23

[56] References Cited

U.S. PATENT DOCUMENTS

| | | | |
|---|---|---|---|
| 1,306,716 | 6/1919 | Powell | 179/17 E |
| 2,123,177 | 7/1938 | Blount | 179/103 |
| 3,033,932 | 5/1962 | Lomax | 179/17 E |
| 3,330,912 | 7/1967 | Koseki | 179/81 A |
| 3,441,684 | 4/1969 | McLeod | 179/81 A |
| 3,517,138 | 6/1970 | Burger | 179/81 A |
| 3,588,360 | 6/1971 | Knox | 179/81 B |
| 3,602,648 | 8/1971 | Holtz et al. | 179/81 A |
| 3,745,261 | 7/1973 | Friedman | 179/81 R |
| 3,784,755 | 1/1974 | Cambridge | 179/81 A |
| 3,899,643 | 8/1975 | Tabalba | 179/81 B |
| 3,963,876 | 6/1976 | Holtz et al. | 179/81 B |
| 4,002,852 | 1/1977 | Martin | 179/81 B |

OTHER PUBLICATIONS

Encyclopedic Dictionary of Electronics and Nuclear Engineering, R. I. Sarbacher, Prentice-Hall, Inc., 1959 p. 574.

American Standard Definitions of Electrical Terms, American Institute of Electrical Engineers, 1941, p. 216.

*Primary Examiner*—George G. Stellar

[57] ABSTRACT

A telephone system is described that includes a long line from a central office to a substation with amplifiers. At the substation a transformer hybrid is used to obtain isolation as well as a high trans-hybrid loss. A precision network balances the hybrid and terminates the long line. Regular telephone receiver and transmitter are used. Amplifiers are operational amplifiers that receive power from the long line. Various means of extending long lines are described using this substation, such as using earth ground.

19 Claims, 8 Drawing Figures

SU B RN BG TP GN SUB W1 P W2 R T KL BA KA C19 S6 S7 C20 L5 CO

FIG I

LONG LINE TELEPHONE SYSTEM WITH AN AMPLIFYING SUBSTATION

BACKGROUND OF THE INVENTION

1. Field of the Invention

This invention is used in a telephone system which has a central office with a switching system and an office battery. Specifically the invention is a substation with amplifiers connected to a long line. The substation must be connected to a long telephone line to operate. Thus, the long line must be included in the invention.

2. Description of the Prior Art

In the past there have been a number of inventions of this type. Many early inventions have amplifiers in the receive branch of an ordinary telephone to increase the level. The gain in the receive branch is low so as not to make the telephone set sing. Most of the early inventions did not use precision hybrids. Many use switches to keep the substation from singing due to feedback from the transmitter to the receiver. One or more use local batteries or local A.C. power.

In more recent years there have been a great many inventions that make use of transmit and receive electronic switching devices. A signal level detector is used in each branch. The branch with the highest level is switched on while the other branch is switched off. In such an arrangement a precision hybrid is not required because the reduced gain is obtained by a switching device. Although this kind of invention may look attractive, it has the objection of the switching action which cuts one part off wholely or partly while the other is talking. It is an unnatural condition.

The new invention is an improved telephone specifically designed for a long telephone line. A precision hybrid is used to obtain a high degree of trans-hybrid loss. A precision network is used to balance the hybrid. The amplifiers are operational amplifiers which consume little power. The microphone is a telephone transmitter, and the speaker is a telephone receiver. In the past little attention has been directed to increasing the line length to make use of the amplification added. This invention is designed to increase the line length considerably.

SUMMARY OF THE INVENTION

An improved telephone substation is connected to a long telephone line. The long line originates at a central office with an office battery, a signaling voltage source, and a switching system. The office battery and signaling voltage source are earth grounded. The substation performs all the normal functions of a telephone. In addition, the substation has amplifiers in both the transmit and receive circuits. The amplifiers have slope equalizing networks. A precision transformer hybrid circuit is used to obtain a high degree of trans-hybrid loss. A precision network with several components is used to balance the hybrid against the long line and to terminate the long line. A transformer is used on the input of the receiver circuit to isolate the long line from the substation ground, the input having a high impedance. A carbon transmitter is used as a microphone, using current from the long line for power. The carbon microphone provides gain. A telephone receiver is used for the speaker, providing high gain. Various long lines are described that are included as part of the invention, for instance using earth ground return.

DETAILED DESCRIPTION

Figure 1:
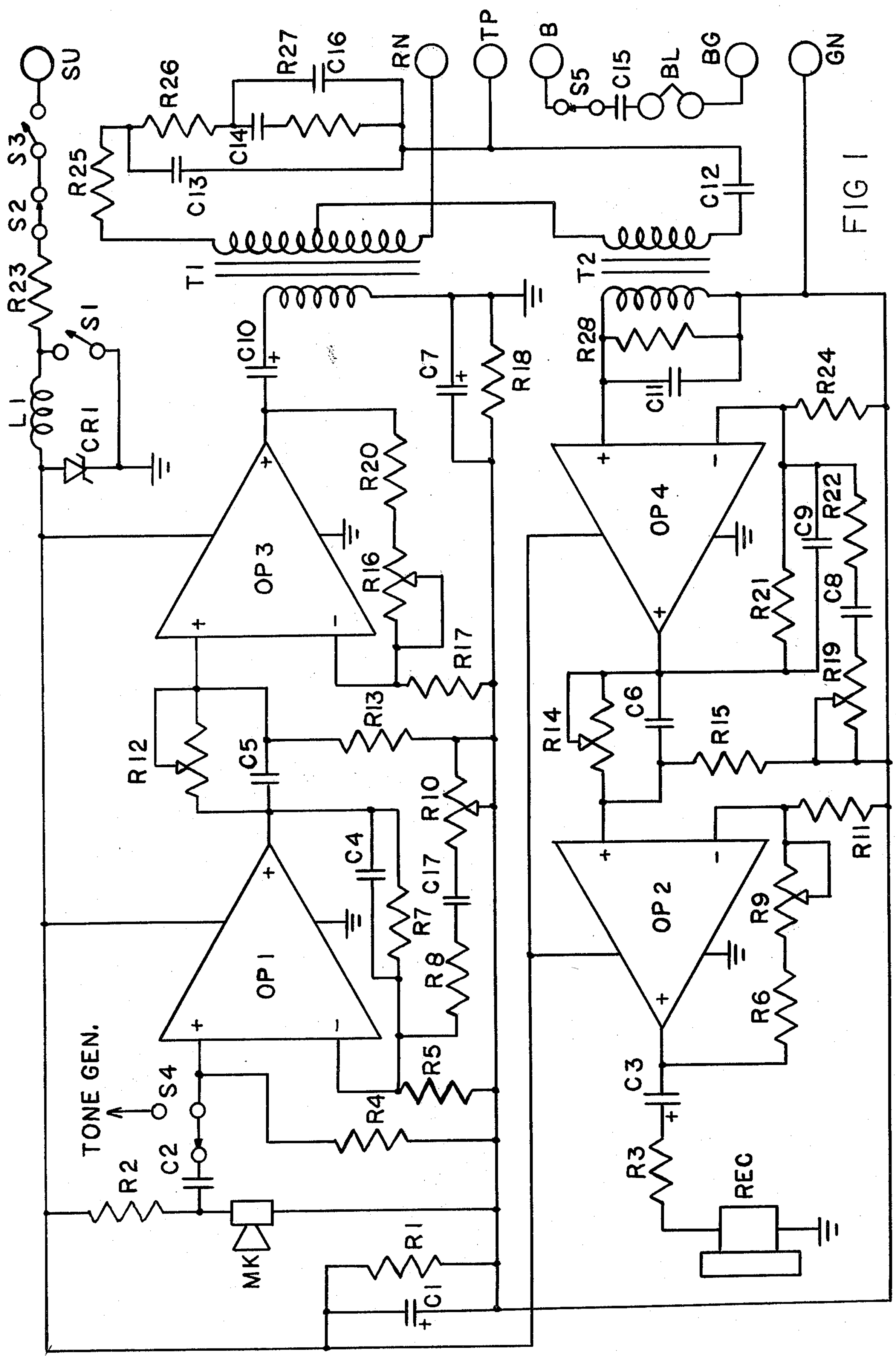
FIG. 1 is a schematic diagram of the substation.

FIG. 1 shows a schematic diagram of the substation which is an example. FIG. 1 shows the preferred embodiment of the substation, a part of the invention. T1 is a hybrid transformer with three windings which have exactly the same number of turns. The turns on each side of the secondary centertap are equal and balanced to ground. A pair P of wires in the long line is connected to terminals TP (tip) and RN (ring). The pair P of wires W1 and W2 in the long line is a balanced line that is long enough to have the approximate characteristic impedance $Z_o$. Thus, from TP to RN is connected an impedance $Z_o$. Components R25, R26, R27, C13, C14, and C16 form a precision "T" type network much like an artificial line. Resistor R25 connects an impedance to one half the secondary of T1, the impedance simulating $Z_o$ which connects to the precision network branch of the hybrid circuit. The other half of T1 secondary connects to RN, the long line branch of the hybrid circuit. Terminal TP is common to the long line pair P and to the precision network at R27. Since equal impedances $Z_o$ are connected across equal windings of T1, the center tap of T1 will be at the center of a bridge where zero voltage appears when a voltage is impressed on the primary of T1. When transmitting, a voltage impressed at C10 on the primary of T1 will be greatly attentuated at the center tap of T1. It should be pointed out that part of the uniqueness of this invention is this extremely high balance.

The receiver circuit is connected to the center tap of T1 and to TP, the receiver output of the hybrid circuit. Transformer T2 is an isolation transformer which ground isolates the long line pair P from the substation ground GN. The long line pair P must always be balanced to earth ground, which is one reason for the use of T1 and T2. Capacitor C12 is used so that T2 does not short out the long line D.C. wise. Capacitor C11 is a very small capacitor used to reduce noise at high frequencies, for instance radio station noise. Resistor R28 is a high value that loads T2. Operational amplifier OP4 is used to add gain with a particular slope to compensate for the slope of the long line. Components R19, R21, R22, R24, C8, and C9 control the gain and slope of OP4. Potentiometer R19 is used to vary the amount of slope, producing a high slope when R19 is zero. Capacitor C9 reduces the gain of OP4 to unity at very high frequencies. Resistor R15 biases operational amplifier OP2 and provides a low frequency fall off or slope in conjunction with C6. Potentiometer R14 is used to vary the amount of low frequency slope, the slope being zero when R14 is zero ohms. Operational amplifier OP2 provides gain and a low output impedance to drive the speaker REC. Resistors R6, R9, and R11 are used to determine the gain of OP2. Potentiometer R9 varies the gain which is a minimum when R9 is zero ohms. C3 is a large D.C. blocking capacitor. R3 is a limiting or isolation resistor to isolate OP2 from REC at very low and very high frequencies. REC is a telephone receiver which has good gain properties and a high impedance which is easily driven by the output of OP2. Receiver REC is normally mounted in the telephone handset. The word handset is vernacular in the telephone industry for the part of the common telephone which is held in one's hand. A handset is merely a hollow plastic handle or frame which holds a telephone trasmitter in a recess at one end and a telephone receiver in a recess at the other end. Wires and terminals inside the hollow handle are used to connect the telephone transmitter and telephone receiver to other parts of the telephone set. Some companies add a wad of cotton inside the hollow handle to quiet the inside air path of the handset. To give REC mechanical accoustical isolation, REC is shock mounted, the normal mounting being inadequate. For instance, rubber mounting is used. The rubber mounting is a sound vibration absorbing layer of rubber between the telephone receiver and the plastic handle of the handset.

The transmit circuit begins with a microphone MK which is a carbon telephone transmitter normally in the handset. Rubber mounting is used for MK also. The rubber mounting is a sound vibration absorbing layer of rubber between the telephone transmitter and the plastic handle of the handset. The microphone MK receives current through R2, the current being one milliampere in the prototype. Microphone MK provides high gain properties. The output of MK is relatively large compared to other microphones, and so a preamplifier is not needed. The quality is the same as the present day telephone. The A.C. output of MK is coupled by D.C. blocking capacitor C2 to operational amplifier OP1. Switch S4 is needed when a tone generator is used. R4 is a bias resistor. OP1 is used to provide gain with a slope to compensate for the loss characteristic of the long line pair P. Components R5, R7, R8, R10, C4, and C17 are used to determine the slope and gain characteristic of OP1. The slope is adjusted by potentiometer R10, being zero slope at mid frequencies when R10 is a maximum. Capacitor C4 provides a fall off at high frequencies, the gain falling to unity at a very high frequency. R13 is a bias resistor for OP3 and a slope making resistor in conjunction with capacitor C5, the slope being at low frequencies. Potentiometer R12 is used to vary the low frequency slope which can be set to zero slope when R12 is zero ohms. Operational amplifier OP3 provides gain to the signal at C5, the gain being being determined by R16, R17, and R20. Potentiometer R16 varies the gain of OP3 which is a minimum when R16 is zero ohms. OP3 drives transformer T1 primary via a large D.C. blocking capacitor C10 which also isolates OP3 from T1 at very low frequencies. OP3 provides a very low output impedance to drive T1 which is effectively almost a zero A.C. impedance across the primary and secondary of T1. The primary of T1 is the transmitter input of the hybrid circuit. Thus, incoming signals at TP and RN are terminated by the precision network because transformer T2 presents a high impedance and because transformer T1 presents an A.C. short circuit. The precision network terminates the long line pair P in $Z_o$, the characteristic impedance. It is very important that the long line is terminated to prevent reflections that might cause singing in the telephone system.

The supervisory and D.C. current enter the substation at terminal SU. A series of switches are used which will be explained later. D.C. current enters at SU and goes through a limiting resistor R23 and an inductor L1 to zener diode CR1. Inductor L1 provides a high impedance at voice frequencies and a good impedance at 60 cycles. The D.C. current through L1 must be greater than 20 milliamperes to provide supervision to the central office. Zener diode CR1 is at −10 volts in the prototype, and CR1 absorbs most of the current from SU because the operational amplifiers need only a few milliamperes. Resistors R1 and R18 are precision resistors that are equal, the mid point being −5 volts which is the reference voltage. The inputs and outputs of OP1, OP2, OP3, and OP4 are all at the reference voltage. Of course, all voltages are in reference to the substation ground which is brought out on a separate terminal marked GN. Thus, GN can be tied to a number of places as will be explained later. It will be noted that the limitation of the long line is set by the supervisory current of 20 milliamperes and the value of CR1. The power used by the operational amplifiers is small. Since this substation is at the end of a long line, the current through CR1 will never be large. Capacitors C1 and C7 are large electrolytic capacitors, providing A.C. grounding.

The bell BL is brought out on separate terminals B and BG so that it can be jumpered to the other terminals, as required. Depending on the application, terminals B and BG are jumpered as will be explained later. Bell BL is usually activated by 20 cycle voltage applied to tip and ring leads at the central office. Capacitor C15 is a D.C. blocking capacitor. Switch S5 is part of the cradle switch, opening when off hook. Since terminal BG may be connected to earth ground, switch S5 removes a ground path when opened. Although BL is usually a bell, other types of transducers can also be used.

Signaling

The main signaling mechanism is by means of the mechanical rotary dial subassembly at the present time. Therefore, S2 represents a rotary dial switch. S1 represents an auxiliary switch on the rotary dial subassembly which closes whenever the rotary dial is off rest position. S3 is a cradle switch which closes when the handset is lifted from the cradle. To dial, the handset is lifted, closing S3. CR1 receives current, and dial tone is heard at REC. The customer moves the dial off center whereupon S1 closes, shorting out CR1 and deactivating the substation. The customer releases the dial which slowly moves back, opening and closing S2 for dial pulses. When the dial is at rest position again, S1 opens whereupon the substation is reactivated.

The other mechanism for signaling is a tone generator subassembly which is activated by a push button scheme. A combination of two tones is produced when a push button is pushed. This scheme is not shown in FIG. 1. However, the scheme can easily be used at the substation by use of a switch like S4 which switches the input of OP1 to the tone generator subassembly when a push button is pressed. S4 is an auxiliary switch on the tone generator subassembly switch board. S4 is not used with the rotary dial. Of course, a pair of tones is generated only when a push button is held. The tone generator receives power from zener diode CR1 and uses no power unless a button is pushed. Switch S1 is not used, and a wire is used in place of SW2. A jumper arrangement could be used for S1 and S2. In this signaling method a low level signal is all that is required from the tone generator because OP3 acts as the line driver. The line level would be zero DBM for the composite signaling level. The reason the tone generator is not shown is that it is a complete subassembly mounted on the telephone base.

Long Line Systems

Figure 2:
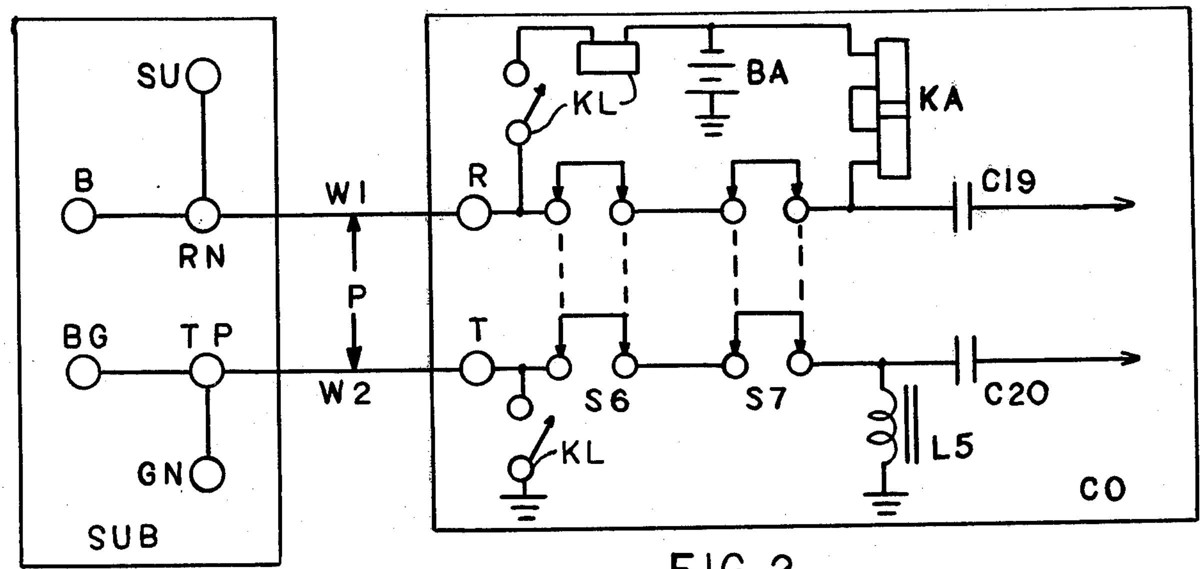
FIG. 2 is a block diagram of the substation connected to a step-by-step central office by a long pair of wires.

The simplest system is the present telephone system in which two wires are used. In FIG. 2 a pair P of long line wires W1 and W2 connect to RN and TP. To use the substation SUB in this present system, the supervisory terminal SU and bell terminal B connect to RN, and the GN and BG terminals connect to TP as shown in FIG. 2. Terminal T (tip) is ground and R (ring) is negative at the central office CO. Ringing is applied to R at the central office CO. The limit of this system is the resistance limit of both wires or 1300 ohms approximately. However, due to the fact that many cables have aged or become "wet", the attenuation is much higher than when they were new. So, the amplifiers of the substation SUB are needed. Of course if a higher voltage battery BA is used, the long line pair P could be extended by making use of the amplifiers.

Figure 3:
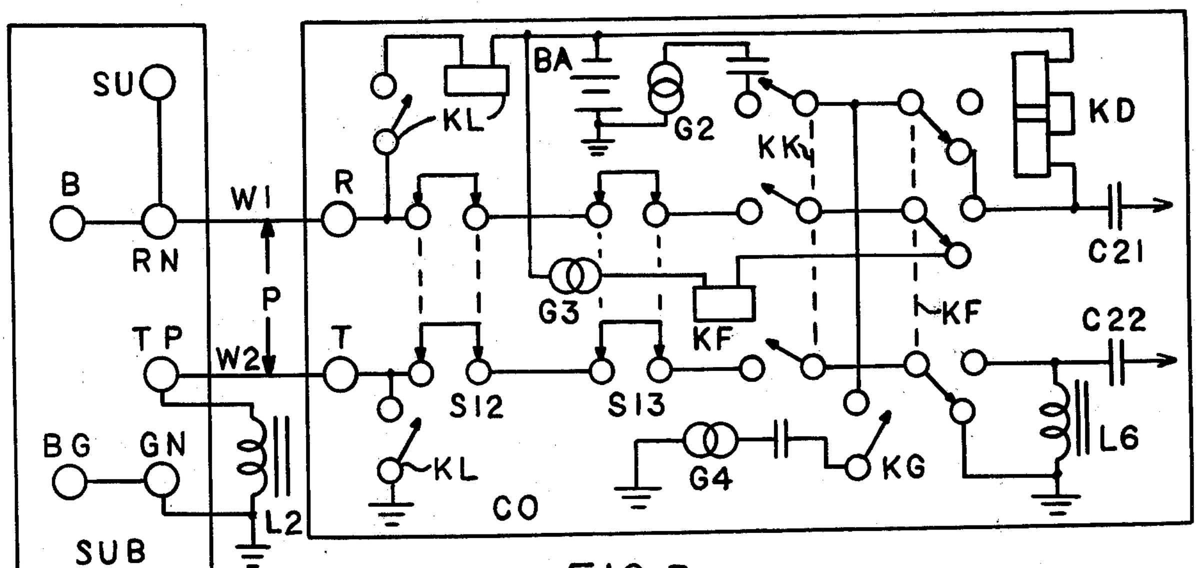
FIG. 3 is a block diagram of the substation connected to a step-by-step central office by a long pair of wires and by earth ground. The central office is about to connect ringing voltage to ring the substation.

The next system that could be used is a two wire pair W1 and W2 similar to what is already used with an earth ground return for the supervisory function as shown in FIG. 3. This system adds approximately 1000 ohms of line to the long line, which just about doubles the line. The central office CO functions are the same with ground on the T (tip) and with battery and ringing on R (ring). However, an inductor L2 is connected from TP to GN, compensating for L1 in order to balance the long line. Terminals B, SU, and RN are jumpered. Terminals BG and GN connect to earth ground. The advantage of this system is that either a very long line can be used or that a short line such as 5 miles of number 26 AWG could be substituted for 5 miles of number 24 AWG. In either case there is a great saving in the amount of copper. Ringing is from R (ring) to earth ground.

Figure 4:
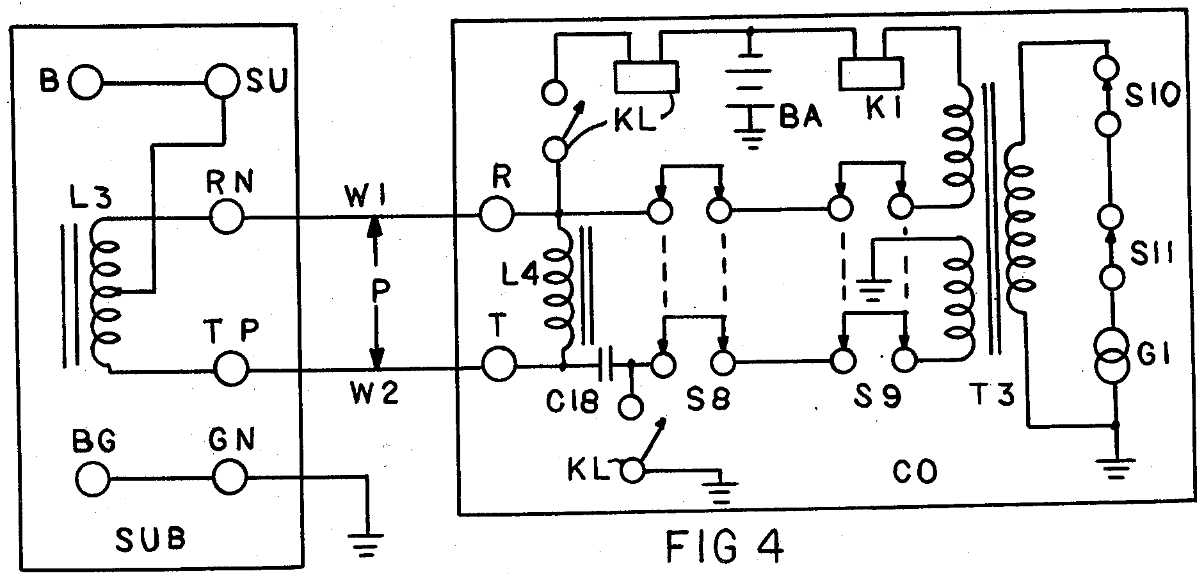
FIG. 4 is a block diagram of the substation connected to a crossbar central office by a pair of wires and by earth ground. The substation is receiving dial tone.

Another system that can be used with the substation SUB is shown in FIG. 4. In this system the D.C. current is conducted by both W1 and W2, a pair of wires. Inductors L3 and L4 are used to connect the long line together D.C. wise at the substation SUB and central office CO respectively. The tip lead is blocked D.C. wise at the central office CO by C18, but the voice frequencies pass C18. Terminals SU and B connect to the center tap of inductor L3, providing balance to ground. Terminals BG and GN connect to earth ground. This system has the advantage that the smallest wire sizes could be used, smaller than number 26 AWG, like number 28 AWG. Alternatively, twice the same size wire could be used. Inductors L3 and L4 can be smaller than L1 and L2. Ringing is from T (tip) and R (ring) to earth ground.

Figure 5:
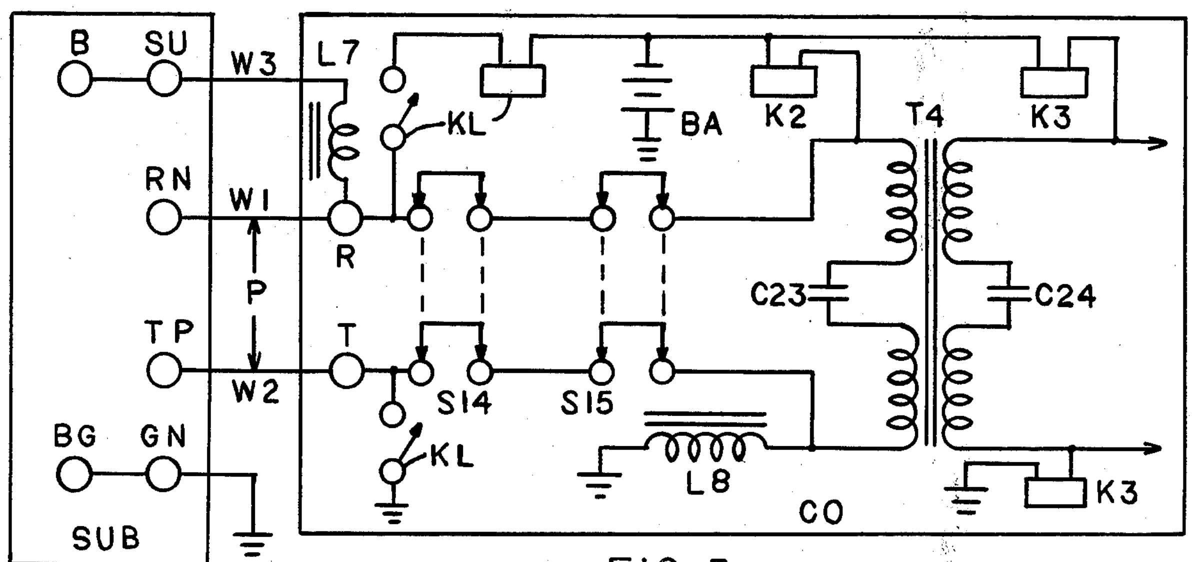
FIG. 5 is a block diagram of the substation connected to a crossbar central office by three wires and by earth ground, two wires of which are a pair.
Figure 8:
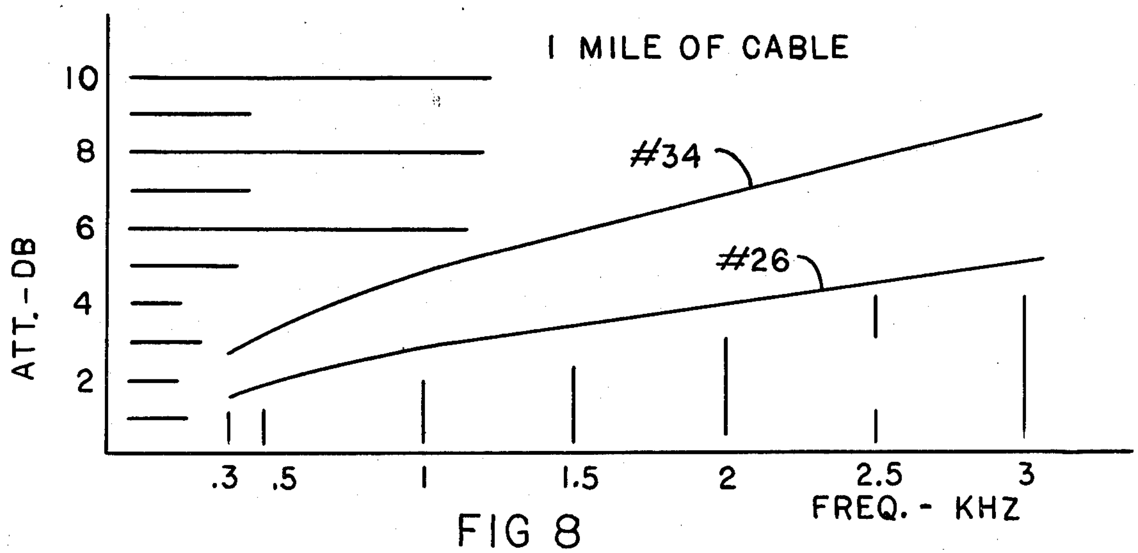
FIG. 8 is a graph of cable attenuation. A number 26 AWG cable is shown together with a new number 34 AWG cable.

The last system to be described is a three wire system shown in FIG. 5. Wires W1 and W2 are a balanced pair P. W3 is a separate wire. This system is probably the most controversial system because it is new and comprises 3 wires. The reason for the three wires is to reduce the copper and the cost. The following example will explain why. The example uses a pair P of number 34 AWG wires W1 and W2 that are balanced to earth ground. Wires W1 and W2 are covered with a foam type of insulation that is approximately 50% air, reducing the dielectric constant considerably. The pair P of wires are spaced apart like they were number 22 AWG, reducing the capacity to 0.037 uf/mi. FIG. 8 shows the resulting attenuation curve for one mile of cable. A curve of number 26 AWG with 0.083 uf/mi is shown in FIG. 8. One mile of this number 34 is equal to 1.7 miles of number 26, the two curves being the same shape then. With the amplification provided by the substation SUB, the number 34 cable can be substituted for the number 26. The third wire W3 is the supervisory wire which is connected to the R terminal at the central office CO through L7 and to SU and B at the substation SUB. Inductor L7 isolates the ring lead. The third wire is number 28 AWG to have only 1028 ohms resistance for three miles of cable. The area of two number 26 wires is 0.000399 sq. inches. The area of two number 34 plus one number 28 is 0.000188 sq. inches or 47% of the above. In other words the new cable has half the copper in it. The BG and GN terminals of the substation connect to earth ground for the supervisory return. Ringing is via the third wire to earth ground. The impedance of the new pair is approximately four times that of number 26 AWG.

Figure 6:
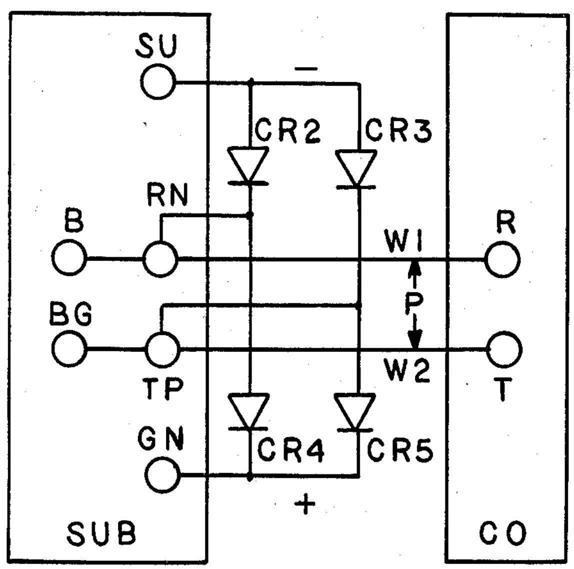
FIG. 6 is a block diagram of the substation connected to a central office by a pair of wires. A full wave bridge rectifier steers the D.C. current.

There are some older central offices that still use reverse battery supervision at the substation. FIG. 6 shows W1 and W2 wires, the normal two wire pair P system of FIG. 2, arranged for this type of system. A bridge rectifier including CR2, CR3, CR4, and CR5 connects to TP and RN, the outputs going to SU (minus) and GN (plus). The bell terminal B connects to RN, and the bell return BG connects to TP. Thus, the ringer bridges W1 and W2. The D.C. line current is directed to SU and GN.

Figure 7:
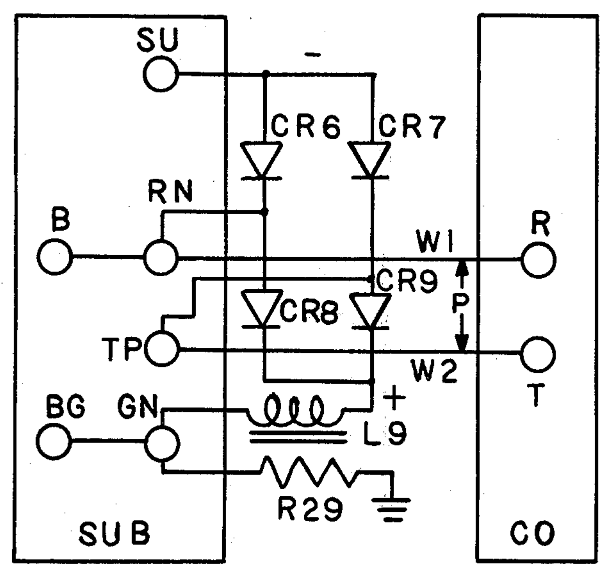
FIG. 7 is a block diagram of the substation connected to a central office by a pair of wires, earth ground return being used. A full wave bridge rectifier steers the D.C. current.

Another arrangement for reverse battery supervision is shown in FIG. 7 where the system of FIG. 3 is modified. D.C. current from wire W1 or W2 is directed to SU by CR6 or CR7. D.C. current is returned to earth ground from GN through a small resistor R29, typically 25 ohms. Inductor L9 connects to GN, balancing L1. Diode CR8 or CR9 connects L9 to W1 or W2, depending on which one is grounded at the central office CO. The GN terminal is approximately $-\frac{1}{2}$ volt, biasing CR8 or CR9 to conduction. The bell terminal B connects directly to W1 at RN where ringing voltage is applied. The bell return BG connts to GN for an earth ground return.

Central Office Arrangement

The central office CO must be arranged to accept the new systems presented in the last section. Of course, nothing new is needed for the arrangement of the substation SUB in FIG. 2. The central office CO in FIG. 2 is part of a step-by-step office which shows the battery BA feed to W1 and W2, the long line. The central office CO has been modified to accept an earth return such as FIG. 3. KL is a line relay which normally puts battery BA on the long line when idle. Switches S6 and S7 illustrate the switches in the line. Relay KA shows one "A" relay, and it has been modified by putting both coils on the ring lead. A balancing inductor L5 is put on the tip lead to balance the long line, being the same inductance as KA. Capacitors C19 and C20 are the D.C. isolating capacitors.

FIG. 4 shows a crossbar central office CO connected through switches S8 and S9 to a transformer T3. Generator G1 is a dial tone generator which is switched by S10 and S11 to T3. The customer dials over both W1 and W2, the current joining at L4 to go through the coil of K1. The return current returns through earth ground to battery BA and relay K1. The battery BA is normally fed through the coil of K1 The rearrangement of current through T3 might require a new design for T3. Relay K1 is a line relay, putting battery BA on the long line when idle. Switch S10 or S11 opens after the first dialed digit.

FIG. 3 shows a step-by-step central office CO that is about to call the substation SUB. Switches S12 and S13 have selected the substation SUB. Relay KL is deactivated when relay KK makes contact, the substation not being in use. Battery BA and ringing generator G3 are connected to wire W1 by relay KK. Ringback tone generator G2 is connected to the calling party by relay KK via C21 and C22. The return from the substation is mostly through the earth ground, some through the W2 wire. When the called party comes off hook, D.C. current flows through the W1 wire and through the coil of KF, tripping the ringing. Battery is transferred to relay KD which is modified to have both coils in the ring lead. Inductor L6 is added to the tip lead to balance the long line, being equal to both coils of KD. Capacitors C21 and C22 are D.C. blocking capacitors. If the substation SUB is busy, relay KG pulls in and KK does not, putting busy tone generator G4 on C21 and C22. An arrangement similar to FIG. 3 is used in other types of central offices also.

FIG. 5 shows a central office CO that has been arranged to work with a three wire long line W1, W2, and W3. Dialing is done over the supervisory line W3 by using the central office CO arrangement of FIG. 3. After dialing switches S14 and S15 close, and D.C. current flows through the ring lead to coil K2, a holding relay. The arrangement of FIG. 5 is the through connection to the called party which has a normal line. Switches S14 and S15 connect the calling party in a crossbar office. Transformer T4 is a matching transformer that matches the new small gauge wire to the called normal line. An example of T4 is a 2 to 1 step down transformer, the new long line pair P having a higher characteristic impedance. Relay KL is the line relay as before. C23 and C24 are D.C. blocking capacitors. Relay K3 is the called party supervision relay. Inductor L8 is a line balancing inductance that balances K2 and L7.

Economics

The main objective of this invention is an improvement of telephone economics. One of the biggest financing problems in the telephone industry is the cost of the outside plant. The wires or cables comprise the biggest cost of the outside plant. The cost of copper is the main cost of wire, the cost going up continually. This new invention will increase the cost of an improved telephone. However, it will reduce the amount of copper in the wires, as explained before. For instance, changing a ten mile run from 19 gauge to 22 gauge would be a great savings in copper, there being half the copper required.

The added cost of the new invention is a printed circuit card with the additional components shown in FIG. 1. Transformer T1 already exists, but it would have to be made better. The operational amplifiers are inexpensive, selling for about 20 cents in quantity. The speaker and microphone already exist. The inductors such as L1, L2, and L3 are new items. Transformer T2 is a new item. The resistors and capacitors are relatively inexpensive. The bell already exists. The added cost of the printed circuit card may double the cost of the substation. However, the overall economic picture is a great savings when one considers the copper saved in the wires.

It is to be understood that the embodiment described herein is merely illustrative of the principles of the invention. Various modifications thereto may be effected by persons skilled in the art without departing from the spirit and scope of the invention.

What is claimed is:

1. A telephone system with a substation comprising: in combination, a long line having a plurality of conductors that are connected at one end to tip and ring leads at a central office and are connected at the other end to said substation, said central office having an office battery and a ringing voltage source which are connected to earth ground, said central office being adapted to operate into said long line, said long line being used to conduct alternating current signals and direct current, at each end two wires of said long line being a pair that is balanced to earth ground and has an approximate characteristic impedance, said long line being at least two miles long, a hybrid circuit having a long branch port, a network branch port, a transmitter input, and a receiver output, said hybrid circuit having a large signal loss between the transmitter input and the receiver output, said pair being connected to the long line branch port of said hybrid circuit, a precision network being connected to the network branch port of said hybrid circuit for the purpose of balancing said hybrid circuit, said network containing a plurality of components that are connected so as to present the approximate characteristic impedance of said pair, said network also being used to approximately terminate said pair, a transmitter circuit having at least one amplifier, the output of said transmitter circuit having a low impedance and being connected to the transmitter input of said hybrid circuit, a microphone being connected to the amplifier input of said transmitter circuit, a receiver circuit having at least one amplifier, the input of said receiver circuit being connected to the receiver output of said hybrid circuit, the amplifier output of said receiver circuit being connected to a speaker, a signaling means being used to transmit numbers in the form of signals to said central office, said signaling means being switched during signaling, a power supply furnishing D.C. power for the active elements of said substation, said power supply receiving D.C. power from said long line, the D.C. line current to said power supply being used for supervision by said central office, a switching means having a plurality of contacts, said switching means deactivating said substation when on-hook, an audio sound making transducer responding to the ringing voltage source of said central office, said transducer being disconnected from said long line by said switch means when off-hook, a mounting means having a frame for holding said microphone and said speaker with at least three inches between to prevent feedback via the atmosphere, said microphone and/or speaker being vibrationally damped, and a return path being an electrical conductor other than the wires of said pair for returning direct current and ringing current from said substation to said central office, components of said substation being selected, arranged, and connected so that the interconnection of said substation to said pair is balanced to earth ground, the components of said central office being selected, arranged, and connected so that the interconnection of said central office to said pair is balanced to earth ground.

2. The telephone system of claim 1 wherein said transmitter circuit has an operational amplifier slope equalization circuit that acts to equalize the loss characteristics of said pair, the negative input and the output of said operational amplifier being connected via a feedback network with at least one resistor and one capacitor, and the negative input of said operational amplifier being connected to a reference voltage via at least one resistor.

3. The telephone system of claim 1 wherein said receiver circuit has an operational amplifier slope equalization circuit that acts to equalize the loss characteristics of said pair, the output and negative input of said operational amplifier being connected via a slope producing feedback network with at least one resistor and one capacitor, bias resistors from a reference voltage biasing the negative input and the positive input of said operational amplifier.

4. The telephone system of claim 1 wherein said transmitter circuit and said receiver circuit each has an operational amplifier slope equalization circuit that acts to equalize the loss characteistics of said pair, the output and negative input of each said operational amplifier being connected via a slope equalization producing feedback network with at least one resistor and one capacitor, and bias resistors from a reference voltage biasing the negative input and the positive input of each said operational amplifier.

5. The telephone system of claim 1 wherein said signaling means is a rotary dial subassembly which makes and breaks the direct current of said long line during dialing, and an auxiliary switch within said dial subassembly being used to deactivate said substation during dialing.

6. The telephone system of claim 1 wherein said signaling means is a two-tone signal producing subassembly with push button selection switches, an auxiliary switch within said two-tone producing subassembly being used to switch out said microphone and to switch in said two-tone producing subassembly when active, and a circuit in said two-tone producing subassembly being activated by pushing a push button.

7. The telephone system of claim 1 wherein said long line is said pair which are connected to all the terminals of said substation, the direct current of said long line being directed to supervisory and ground terminals of said substation by electronic components when reverse battery is used at said central office, said pair being used to carry all the currents of said substation, and one wire of said pair being said return path.

8. The telephone system of claim 1 wherein said long line is said pair, earth ground being said return path, at said substation at least one component being used to balance said pair to earth ground, and a plurality of components being used for steering direct current from said pair to the supervisory terminal of said substation when reverse battery is used at said central office.

9. The telephone system of claim 1 wherein said long line is said pair, both wires of said pair being used to carry direct current and ringing current in the same direction to said substation, at said central office at least one component being used to modify said pair so that the two wires are connected for direct current and ringing current, at said substation at least one component being used to connect said pair for direct current and ringing current, and said return path being earth ground.

10. The telephone system of claim 1 wherein said long line comprises three wires, the first and second wires of said long line being said pair, the third wire of said long line conducting direct current and ringing current, said return path being earth ground, at said central office at least one component being used to A.C. isolate the third wire of said long line from the first and second wires of said long line, and at said central office at least one component being used to balance said pair to earth ground.

11. The telephone system of claim 1 wherein said long line comprises four wires, the first and second wires of said long line being said pair, the third wire of said long line conducting direct current and ringing current to said substation, the fourth wire of said long line being said return path, said central office being adapted to join said third and fourth wires to said second and first wires respectively by adding components, and said central office being adapted to balance said pair to earth ground by adding components.

12. The telephone system of claim 1 wherein said hybrid circuit comprises a transformer hybrid with at least one transformer, a first winding of said hybrid circuit providing earth ground isolation and balance to said pair from the output of said transmitter circuit, and a second winding of said hybrid circuit providing earth ground isolation and balance to said pair from the input of said receiver circuit.

13. A telephone system comprising, in combination, a substation including a hybrid, a precision network, a receiver circuit, a transmitter circuit, a power supply, a switching means, a signaling means, an audio sound making transducer, and a mounting means, a central office having an office battery and a ringing voltage source which are connected to earth ground, tip and ring leads of said central office conveying audio signals, direct current, and ringing signals, said central office having a switching system that is adapted to work into a long line, said long line having a plurality of conductors that are connected at one end to tip and ring leads of said central office and are connected at the other end to said substation, at each end two wires of said long line being a pair that is balanced to earth ground and has an approximate characteristic impedance, said pair at least carrying voice signals, said long line being at least two miles long, said hybrid having a transmitter input and a receiver output with a large signal loss between the transmitter input and the receiver output, said precision network containing a plurality of components which are connected to said hybrid for balancing and terminating said pair, said transmitter circuit having at least one amplifier with a predetermined gain characteristic and with the output connected to the transmitter input of said hybrid, a microphone being connected to the amplifier input, said receiver circuit having at least one amplifier with a predetermined gain characteristic and with the input connected to the receiver output of said hybrid, the amplifier output connected to a speaker, said signaling means conveying number signals to said central office via said long line, said power supply producing D.C. power from D.C. power conveyed to said substation in at least one wire of said long line, said power supply having voice frequency isolation from said pair, said switching means having a plurality of contacts, said switching means deactivating said substation when on-hook, said audio sound making transducer responding to the ringing voltage source of said central office, said mounting means having a frame for holding said microphone and said speaker with at least three inches inbetween to prevent feedback via the atmosphere, said microphone and/or speaker being vibration damped to prevent mechanical feedback, and a return path being an electrical conductor other than the wires of said pair for returning direct current and ringing current from said substation to said central office, a first line balancing means being used to balance said pair to earth ground at the interconnection of said substation to said long line, a second line balancing means being used to balance said pair to earth ground at the interconnection of said central office to said long line.

14. The telephone system of claim 13 wherein said long line is said pair which is connected to all terminals of said substation, one wire of said pair being said return path, when reverse battery is used at said central office components directing current to said substation.

15. The telephone system of claim 13 wherein said long line is said pair, earth ground being said return path, said first line balancing means with at least one component balancing said pair to earth ground, at least one electronic component being used to direct current to said substation when reverse battery is used at said central office.

16. The telephone system of claim 13 wherein said long line is said pair, both wires of said pair carrying direct curent and ringing current to said substation, earth ground being said return path, said second line balancing means including at least one component to join the two wires of said pair for direct current and ringing current, said first line balancing means including at least one component for joining the two wires of said pair for direct current and ringing current.

17. The telephone system of claim 13, wherein said long line is three wires, the first and second wires being said pair and the third wire conducting direct current and ringing current to said substation, earth ground being said return path, said second line balancing means including at least one component to join said third wire to said first or second wire and to balance said pair to earth ground.

18. The telephone system of claim 13 wherein said long line is four wires, the first and second wires of said long line being said pair, the third wire of said long line carrying direct current and ringing current to said substation, the fourth wire of said long line being said return path, said second line balancing means including components to join said first and second wires to said fourth and third wires respectively, and said second line balancing means including components to balance said pair to earth ground.

19. The telephone system of claim 13 wherein said hybrid comprises a transformer hybrid with at least one transformer, a first winding of said hybrid providing earth ground isolation and balance to said pair from the output of said transmitter circuit, and a second winding of said hybrid providing earth ground isolation and balance to said pair from the input of said receiver circuit.

* * * * *